Aug. 14, 1945.  A. J. BRUNNER  2,382,200
MOLDING APPARATUS
Filed Feb. 22, 1944  3 Sheets-Sheet 2
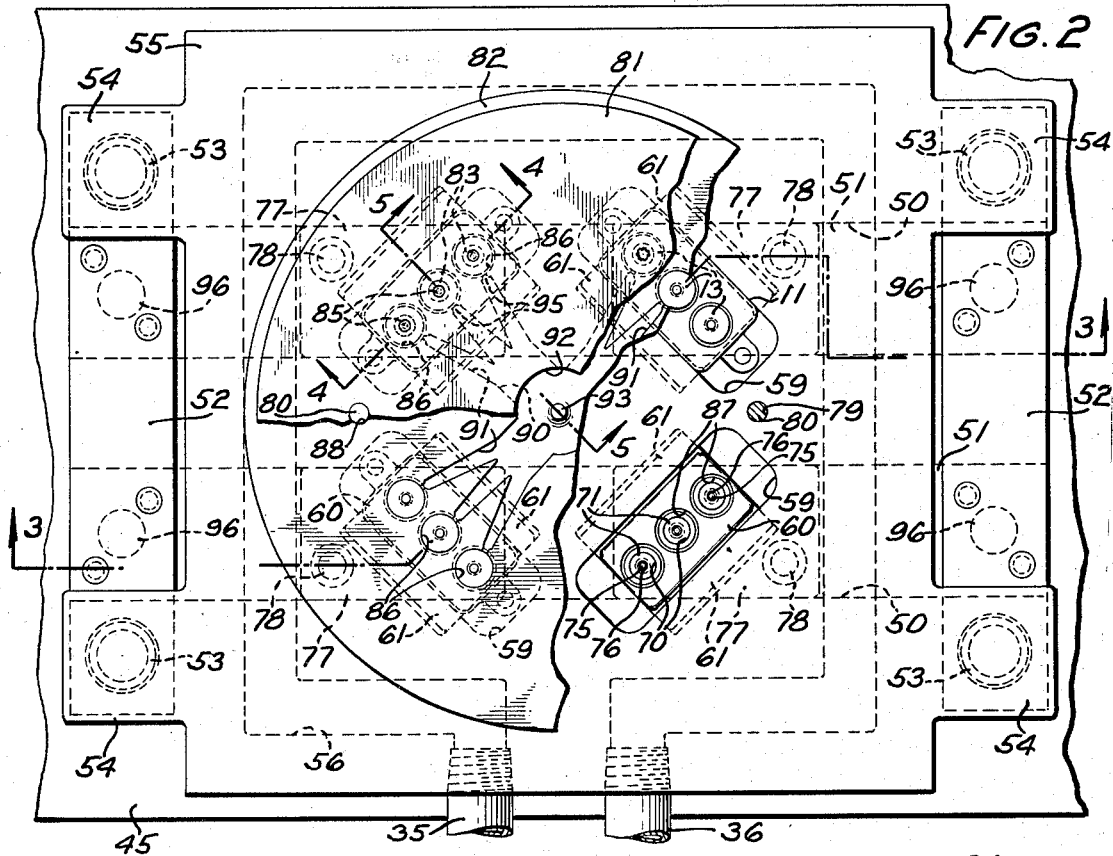
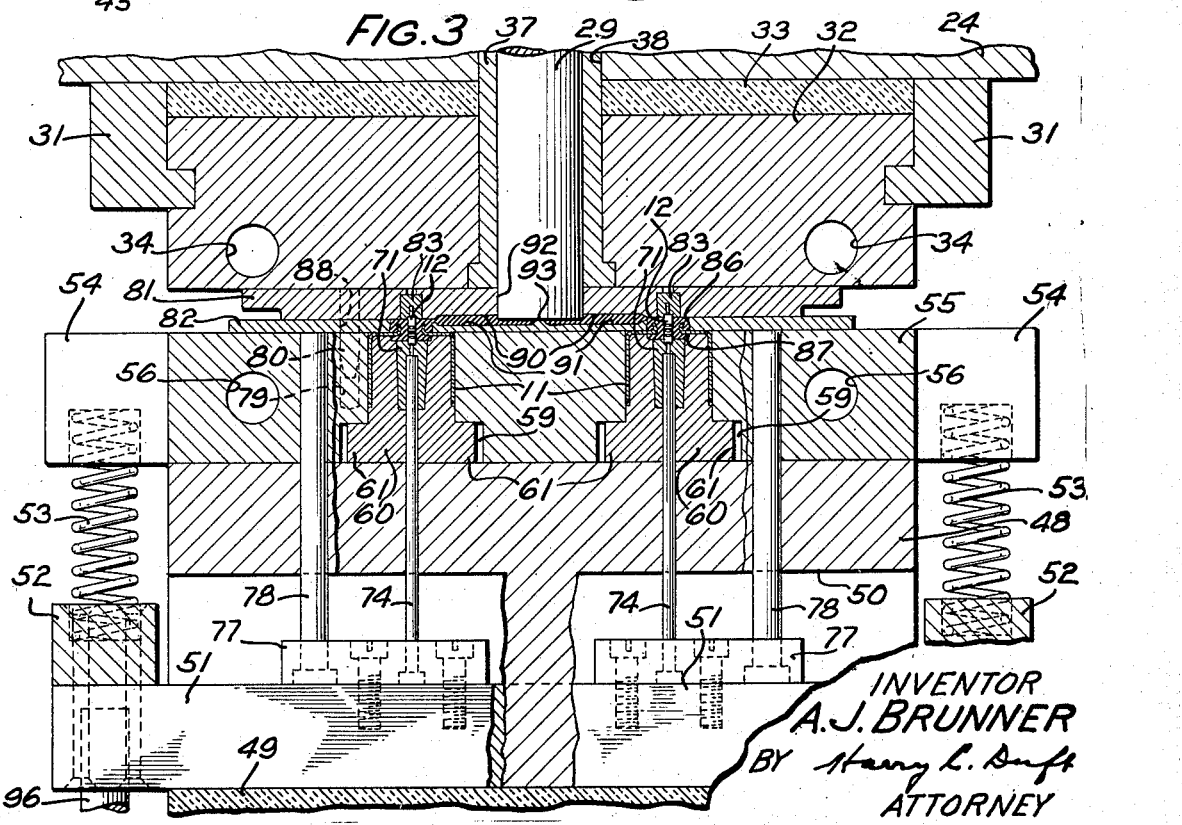
INVENTOR
A.J. BRUNNER
BY Harry L. Duft
ATTORNEY Aug. 14, 1945.   A. J. BRUNNER   2,382,200
MOLDING APPARATUS
Filed Feb. 22, 1944   3 Sheets-Sheet 3

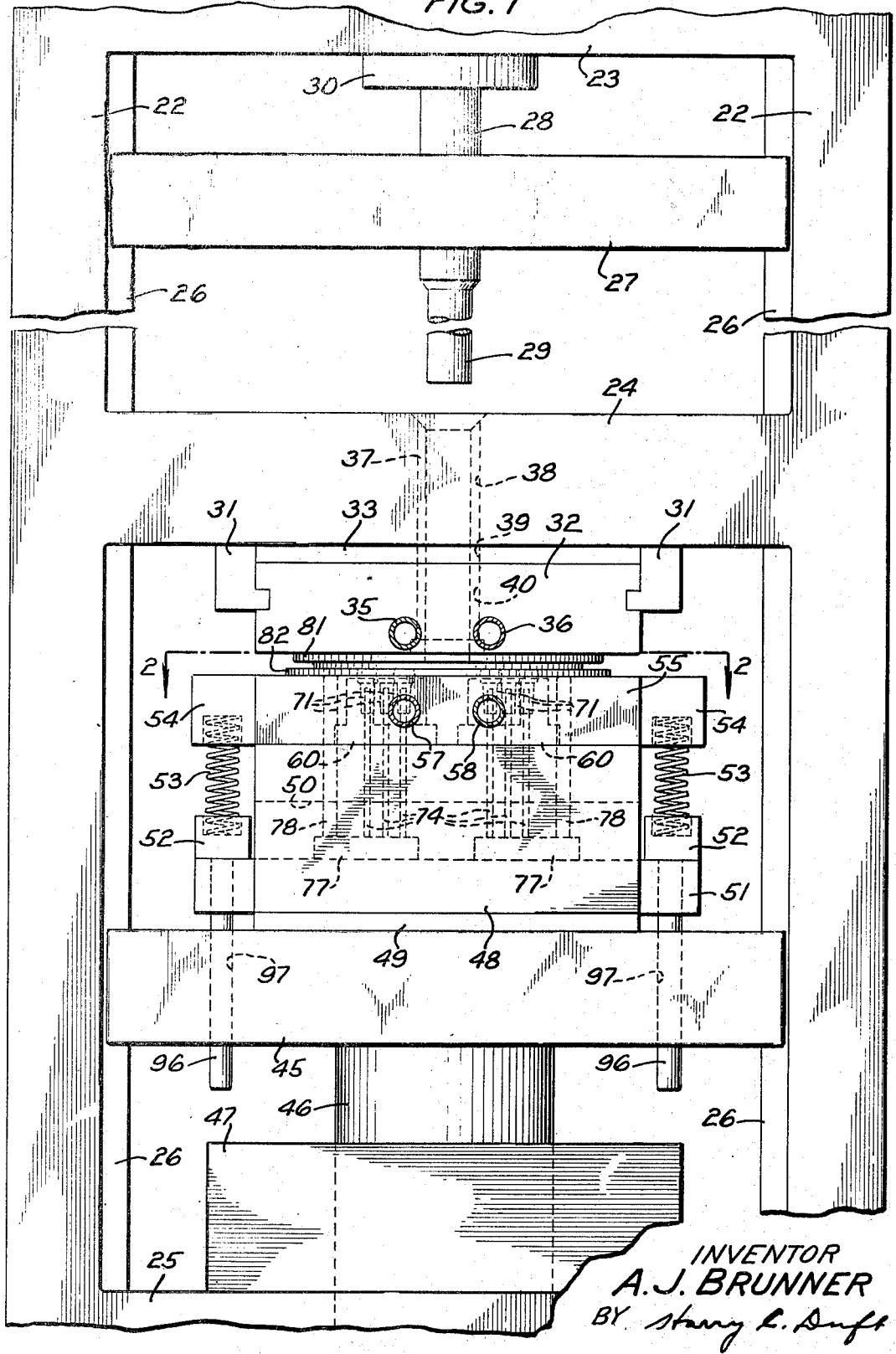

INVENTOR
A. J. BRUNNER
BY *Harry R. Duft*
ATTORNEY

Patented Aug. 14, 1945

2,382,200

UNITED STATES PATENT OFFICE 2,382,200

MOLDING APPARATUS

Anton J. Brunner, Congress Park, Ill., assignor to Western Electric Company, Incorporated, New York, N. Y., a corporation of New York Application February 22, 1944, Serial No. 523,451

5 Claims. (Cl. 18—36)

This invention relates to molding apparatus and more particularly to an apparatus for molding sealed terminal supports in condenser can covers.

It is an object of the present invention to provide a simple and effective apparatus for expeditiously molding articles.

In accordance with one embodiment of the invention, a pair of cooperating plates removably positioned on the lower of two press platens cooperate to define the upper portion of die cavities, the lower portions of which are formed in inserts in the lower platen whereby molding material injected between the plates may be directed through an aperture in a condenser can cover and formed on opposite sides of the cover to mold a tubular terminal member in place with respect to the can cover. The upper of the two plates and the insert in the lower platen are provided with guide members for holding the terminal during the molding operation and means are provided for stripping the molded part and can cover from the inserts in the lower platen.

A complete understanding of the invention may be had by reference to the following detailed description when considered in conjunction with the accompanying drawings, wherein Fig. 1 is a front elevational view of a molding press in which the invention is embodied;

Fig. 2 is a plan sectional view taken substantially along the line 2—2 of Fig. 1 in the direction of the arrows, parts being broken away to more clearly illustrate some of the apparatus positioned directly below them;

Fig. 3 is an irregular vertical sectional view taken substantially along the line 3—3 of Fig. 2 in the direction of the arrows illustrating features of the stripping mechanism;

Figure 6:
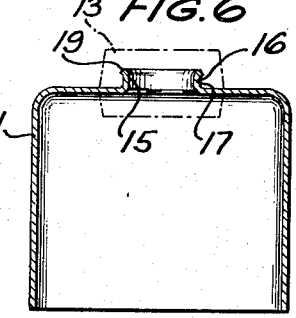
Fig. 6 is a transverse sectional view taken through a condenser can cover prior to the securing therein of a terminal and showing the location of the molded part in dot and dash lines.
Figure 7:
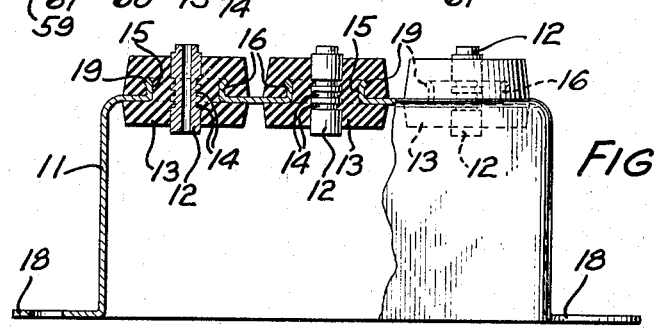
Fig. 7 is a side elevational view, partly broken away, of a condenser can cover having tubular terminal members fixed therein by means of the apparatus shown in Figs. 1 to 5.

In the preferred form of the invention, a condenser can cover 11, as shown most clearly in Figs. 6 and 7, has a tubular terminal member 12 hermetically sealed to it. In order to facilitate the fixing of the terminal member 12 in a body of molded material 13, which seals it to the can cover, the terminal member is provided with a series of annular grooves 14, which will receive the molded material and serve to lock the terminal member therein. The can cover is provided with a plurality of apertures 15 which, in the present embodiment of the invention, are three in number, as shown in Fig. 7, and the upper surface of the can cover is deformed to provide an annular shoulder 16 surrounding the aperture and terminating in a lip or flange 19 extending radially outwardly from the aperture, thus to provide a groove 17 adapted to receive some of the molding material 13. By providing this particular construction, the likelihood of seepage of air through the molded material 13 along the line of its engagement with the can cover around the aperture 15 is minimized and a more rigid interconnection between the metal of the can cover 11 and the terminal member 12 is effected. The can cover, in addition to having the series of apertures 15 formed in it, is provided at its bottom surface with laterally extending webs or ears 18, whereby the can cover may be mounted on any suitable framework adapted to support the condenser after it is completed.

The apparatus provided for fixing the tubular terminal members 12 in the can covers 11 by molding the body of molded material 13 in place, as shown in Figs. 6 and 7, comprises a molding press provided with upright support member 22—22 formed integrally with a head member 23, fixed bolster 24, and a base member 25 (Fig. 1). Suitably attached to or formed integrally with the upright members 22—22 are ways 26—26, which extend between the head member and fixed bolster and between the fixed bolster and base member. In the area of the apparatus between the head member 23 and fixed bolster 24, the ways 26—26 serve to guide a cross head 27 for imparting rigidity to and guiding the movement of a piston rod 28 having an extruding ram 29 on its lower end. The piston rod 28 is suitably fixed to the cross head 27 and since the cross head 27 travels on the ways 26—26, the piston rod 28 will be guided in its movement, under the influence of fluid under pressure supplied to a cylinder 30, to actuate the piston rod 28.

The fixed bolster 24 has support members 31—31 suitably attached to it for supporting an upper platen 32 in fixed relation to the bolster 24, a slab of asbestos 33 or the like being interposed between the platen 22 and the fixed bolster 24 to thermally insulate the bolster from the platen, which is adapted to be heated. Any suitable means for heating the upper platen 32 may be provided and in the embodiment of the invention illustrated herein the platen is shown as being provided with a passageway 34 (Fig. 2), through which a heating medium may be circulated, the heating medium being fed into the passageway 34 through a hose connection 35, and being conducted back to the source thereof (not shown) by a hose connection 36. While a fluid heating means has been illustrated herein, it will be understood that other means for heating the platen might be provided. The ram 29 is positioned to enter a sleeve 37, which is mounted in aligned apertures 38, 39 and 40 in the fixed bolster 24, sheet of asbestos 23, and platen 32, respectively. In the operation of the apparatus, a preformed block or rod of molding material, preferably a thermosetting material such as "Bakelite," may be placed in the sleeve 37 and when the ram 29 is moved downwardly, it will apply pressure to the heated material in the sleeve to plasticize it and to effect an extrusion of the moldable material out of the sleeve.

Slidably mounted on the lower portion of the ways 26—26 is a slidable bolster 45, which is secured to the upper end of a piston 46 adapted to be actuated by fluid under pressure in a cylinder 47. Slidable bolster 45 serves to support a platen supporting block 48, which is suitably secured to the slidable bolster and thermally insulated therefrom by a sheet of asbestos 49 or other suitable heat-insulating material. The platen supporting block 48 has a pair of cutouts 50—50 formed transversely of it for receiving a pair of stripper-supporting bars 51—51, which extend beyond the ends of the block 48 and are interconnected by tie bars 52—52. The stripper-supporting bars 51—51 are normally urged downwardly into engagement with the sheet of asbestos 49 by compression springs 53—53, which are interposed between the tie bars 52 and projecting lugs 54, which extend outwardly from the sides of a lower platen 55 suitably attached to the block 48. The platen 55 is provided with passageways 56, similar to the passageways 34 in the upper platen 32. The lower platen may have a supply of heating medium circulated through its passageway 56 through hose connections 57 and 58. The platen 55 is provided with four irregularly-shaped apertures 59—59 designed to receive and lock four positioning blocks 60—60 in position in the platen through the cooperation of shoulders 61—61 on the positioning blocks with shoulders formed in the apertures 59. In this manner, the positioning blocks 60—60 are held in position between the surfaces of the apertures 59 and the upper surface of the platen-supporting block 48. Each of the positioning blocks 60 has three tapered sockets 70 formed in it for receiving tapered inserts 71. The lower ends of each of the sockets 70 is in communication with an aperture 72, which extends completely through the positioning block 60 and is in alignment with an aperture 73 formed in the platen-supporting block 48.

Positioned in the apertures 72 and 73 and extending partway through the insert 71 is a stripper pin 74, which carries at its upper end a positioning pin 75 adapted to enter into the central aperture of a tubular terminal member 12 to assist in supporting it in a terminal-receiving socket 76 cut in the upper surface of the insert 71.

Since in the embodiment of the invention disclosed herein three terminals are to be attached in each condenser can cover 11, there will be twelve stripper pins 74—74 provided in the apparatus, which is designed to simultaneously mold the terminals into four separate can covers. The pins 74—74 are positioned on the upper surface of the stripper-supporting bars 51 by means of retainer blocks 77—77, of which there are two mounted on each of the stripper-supporting bars. In addition to attaching the stripper pins 74 to the stripper-supporting bar 51, each of the blocks 77 serves to support an appreciably larger stripper pin 78 in the position best seen in Fig. 2. The purpose of these larger stripper pins will be apparent as the description progresses.

Figure 4:
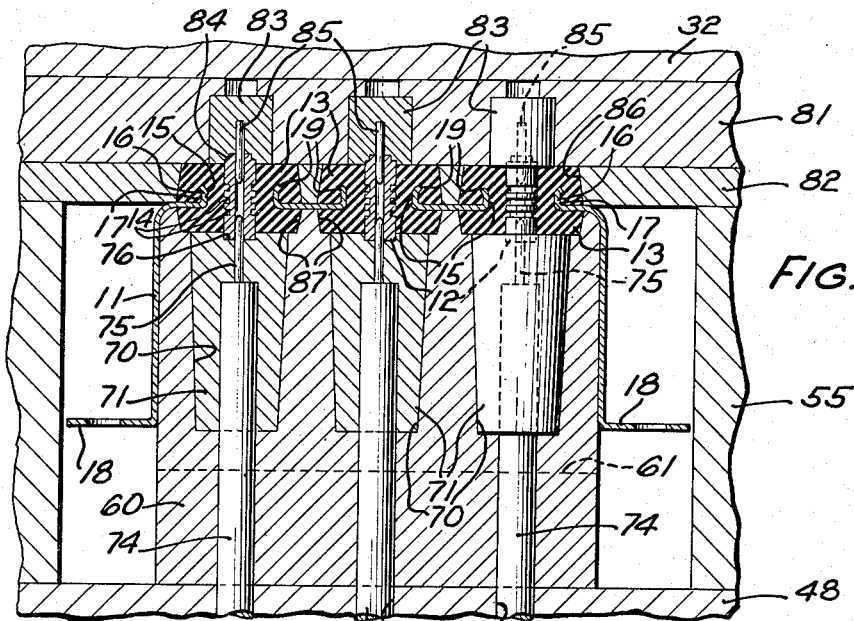
Fig. 4 is an enlarged fragmentary sectional view taken substantially along the line 4—4 of Fig. 2 in the direction of the arrows and showing the terminal supporting devices on an enlarged scale and also showing the molded part after the molding operation is complete.
Figure 5:
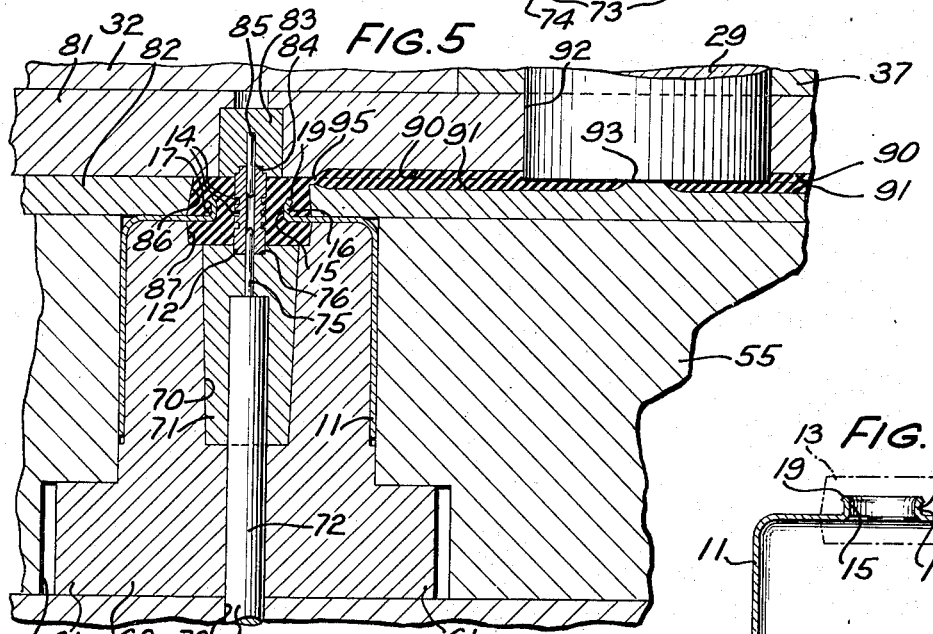
Fig. 5 is a vertical sectional view on the same scale as Fig. 4 showing the relationship of the plates which serve to form the upper portion of the mold cavity.

The lower platen 55 is provided with a pair of apertures 79, into which liner pins 80 may enter for properly aligning upper and lower mold-defining plates 81 and 82, the pins 80 being fixed in the plate 81 and extending through apertures 88 in the plate 82. These plates 81 and 82 are so positioned that operation of the stripper pin 78 will lift the plates 82 and 81 off the platen 55, as will be described hereinafter. The upper mold-defining plate 81, as seen most clearly in Figs. 4 and 5, has a series of inserts 83 mounted in it, each of which will align with the inserts 71 in the positioning blocks 60. Each of these mold inserts is provided with a relatively shallow pocket 84 adapted to receive the upper end of the terminal member 12 when the press is loaded and each insert also has a locating pin 85 positioned centrally of it for extending into the central bore in the tubular terminal member 12 to assist in positioning the member 12. Coaxially positioned with respect to the pin 85, when the plates 81 and 82 are positioned as shown, are a series of apertures 86—86 in the plate 82, which serve to define the side of the upper portion of the mold cavity. In alignment with these apertures 86—86 and formed in the blocks 60—60 are a series of cavities or pockets 87—87, which cooperate with the inserts 71—71 to define the lower portion of the mold cavities.

When the plates 81 and 82 are assembled in position on the lower platen 55, cooperating grooves 90 and 91 formed on the underside of the plate 81 and on the upper surface of the plate 82, respectively, comprise passageways or runways extending from a central aperture 92 in the upper plate 81. The aperture 92 is in direct alignment with the inner surfaces of the sleeve 37 and constitutes a prolongation thereof. The grooves 90 and 91 formed in the plates 81 and 82 are formed as shown in Fig. 2 to feed the moldable material to all of the cavities. The grooves 91 in the plate 82 terminate at a central bump or projection 93, which serves as a means for directing the moldable material radially outwardly in all directions, projection 93 being located centrally of the plate 82 and coaxial with the axis of the ram 29. The grooves 90 and 91 are so formed that adjacent the mold cavity they are appreciably reduced and will serve to direct moldable material which has been rendered plastic by the application of heat and pressure thereto through a restricted orifice, as indicated at 95, and into the mold cavity defined by the inserts 71 and 83, plates 81 and 82 and block 60.

Fixed to the stripper-supporting bars 51, adjacent their ends, are a series of four knockout pins 96, as seen most clearly in Figs. 1 and 2. These knockout pins extend through and are freely slidable in apertures 97—97 formed in the slidable bolster 45. The pins 96 are further aligned to contact with the upper surface of the cylinder 47 when the piston 46 is moved to its lowermost position, thus to compress the springs 53 and move the stripper-supporting bar 51 relatively upwardly with respect to the lower platen 55.

The apparatus described in detail hereinbefore may be operated to perform a molding operation by following the sequence of steps outlined hereinafter. In its normal or inoperative position, the ram 29 is in its upper position, as indicated in Fig. 1, and in its inoperative position the piston or ram 46 is moved downwardly from the position shown in Fig. 1 and the pins 96 will have engaged the upper surface of the cylinder 47, thereby to compress the springs 53 and raise the stripper-supporting bar 51. When the stripper-supporting bar 51 is raised relative to the platen-supporting block 48 and platen 55, the stripper pins 74 and the larger stripper pin 78 will be moved relatively upward from the positions shown in detail in Figs. 3, 4 and 5 and will have moved the plates 81 and 82 and a can cover 11 in which a terminal 12 has been secured, upwardly due to the relative upward movement of the insert 71 with respect to the positioning blocks 60 and slidable bolster 55 to strip a previously formed article from the block 60. In order to condition the apparatus for operation, the previously formed parts must be removed by removing the assembled plates 81 and 82, from which the parts may be stripped, in any suitable manner and thereafter the plates 81 and 82 may be returned to the position shown in the drawings after terminal members 12 have been placed on the positioning pins 75 and after can covers 11 have been placed on the positioning blocks 60. The can covers 11 and terminal members 12 may be placed in position on their respective positioning block and positioning pin after the ram 46 has been moved upward far enough to permit the springs 53 to move the stripper-supporting bar 51 into engagement with the sheet of asbestos 49. When, through the operation of the piston 46, the lower platen 55 is in an intermediate position, that is, between the position shown and the lowermost position, where slidable bolster 45 engages cylinder 47, a pair of plates 81 and 82 may be set into position on the platen 55 and properly located by means of the liner pins 80. After the terminal members and can covers, as well as the plates 81 and 82, have been positioned as just described, the press may be closed by raising the slidable bolster 55 to the position shown in the various figures of the drawings. Thereafter, a supply of moldable material, for example, "Bakelite," either in powder form or in the form of a preformed slug of partially cured material, may be placed within the sleeve 37 and with the apparatus thus loaded, heat may be supplied to the two platens simultaneously by passing steam or heated fluid through the hose connections 35, 36, 57 and 58 while the ram 29 is applying pressure to the material in the sleeve 37. When the moldable material becomes plastic, the pressure exerted thereon by the ram 29, in its movement downwardly under the action of the piston rod 28, will serve to inject the moldable material through the passageways formed by the grooves 90 and 91 and through the orifice 95 adjacent each mold cavity defined by the various plates and inserts. The moldable material will then flow at relatively high speed into the cavity and will, upon the application of further heat and pressure, solidify to lock the tubular terminal member 12 in position in the aperture 15 in the condenser can cover. After the moldable material has cured in the mold cavity, the ram 29 may be retracted to the position shown in Fig. 1 by retracting the piston rod 28 and the parts may be stripped from the apparatus by lowering the slidable bolster 45, thus to first separate the platens 32 and 55 and then to strip the plates 81 and 82 of the condenser can cover 11 with the terminal 12 molded in it from the lower platen 55. The operation of stripping the plates is effected through the instrumentality of the knockout pins 96 moving the stripper-supporting bar 51 relatively upwardly with respect to the platen 55, as described hereinbefore.

What is claimed is:

1. In a molding apparatus for molding terminal inserts in housings, a pair of cooperating plates having surfaces defining a passage for molding material and having other surfaces defining a portion of a mold cavity, a block cooperating with said plates to support the housing and to define other portions of said molding cavity, an insert mounted in one of said plates for defining a further portion of the mold cavity, an insert in said block for defining the remainder of said mold cavity, said inserts having cooperating surfaces to support the terminal inserts, means for heating said plates and block, and means for forcing moldable material through the passage to the mold cavity.

2. In a molding apparatus for molding terminal inserts in housings, means for positioning a housing to have a block of material molded therein, means for positioning the terminal member in an aperture in said housing, said positioning means including a block for positioning the housing and a removable insert supported by said block for positioning the terminal member, a pair of mold-defining plates, means for directing a moldable material between said plates, and means in one of said plates cooperating with the removable insert to support the terminal member in the aperture in the housing during the molding of moldable material around the terminal.

3. In a molding apparatus, a pair of heated platens, a pair of cooperating plates having surfaces defining a portion of a mold cavity and adapted to be heated by one of said platens, an article-positioning block having surfaces defining another portion of the cavity adapted to be heated by the other platen, and removable inserts in said block and one of said plates for defining other portions of said cavity and for supporting a member to be attached to said article.

4. In a molding apparatus for hermetically sealing terminals in apertures in a housing, means for positioning a housing to have a terminal member sealed thereto, a pair of separable plates for defining a portion of a mold cavity outside of the housing, means on said housing-positioning means for defining a portion of the mold cavity within the housing, and a removable insert in said housing-positioning means for defining the remainder of the mold cavity and movable to strip a housing and assembled terminal member from the positioning means.

5. In a molding apparatus, a base die member having an aperture therethrough, a movable die member in said aperture and forming with said base die member, an annular space for receiving the side walls of a cup-shaped housing, said movable die member having a mold cavity under an aperture in said housing, a plate forming an extension of said die cavity outside of said housing, a second plate forming a closure for said die cavity, and means for extruding moldable material into said die cavity to form a molded member gripping the housing edges around the aperture therein.

ANTON J. BRUNNER.